May 21, 1929.  M. HIBBARD  1,714,221
CABLE SHEAVE
Filed Oct. 15, 1923  2 Sheets-Sheet 1
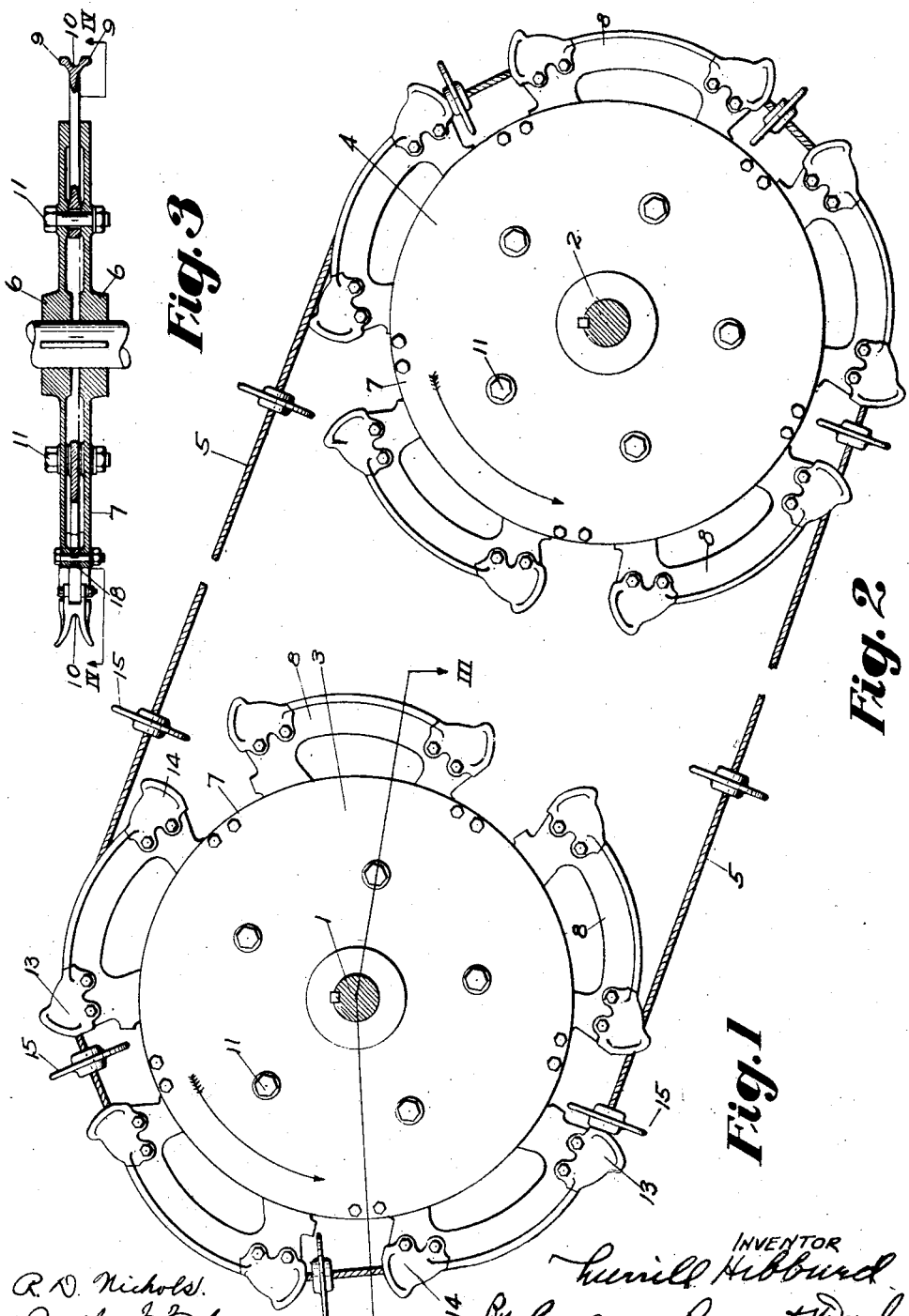

Patented May 21, 1929.

1,714,221

UNITED STATES PATENT OFFICE.

MERRILL HIBBARD, OF COLUMBUS, OHIO, ASSIGNOR TO THE JEFFREY MANUFACTURING COMPANY, OF COLUMBUS, OHIO, A CORPORATION OF OHIO.

CABLE SHEAVE.

Application filed October 15, 1923. Serial No. 668,688.

The present invention relates to certain new and useful improvements in cable sheaves of the class adapted to engage the transmission block attached to an endless cable and thereby either drive the cable or be driven by it.

In certain inclined conveyers subject to intermittent loading, power must be applied to the cable to initially start the conveyer, but, when fully loaded, the weight of the load tends to drag the cable causing it to exert a driving effort which must be resisted by suitable retarding devices associated with the power mechanism, causing the sheave wheels alternately to act as driver and driven.

It is the especial object of this invention to provide, in a sheave of the class described, automatically adjustable rim parts whereby said sheave may be adapted to alternately drive the cable or be driven by it.

The means whereby I attain this object are fully set forth in the following specification, and illustrated in the accompanying drawings of which—

Fig. 1 is a side elevation of the preferred embodiment of my invention in driving relation with a suitable cable.

Fig. 2 is a similar view of such a sheave as shown in Fig. 1 in driven relation to said cable.

Fig. 3 is a transverse section taken along the line III—III of Fig. 1.

Like numerals refer to similar parts in the several figures.

Figure 4:
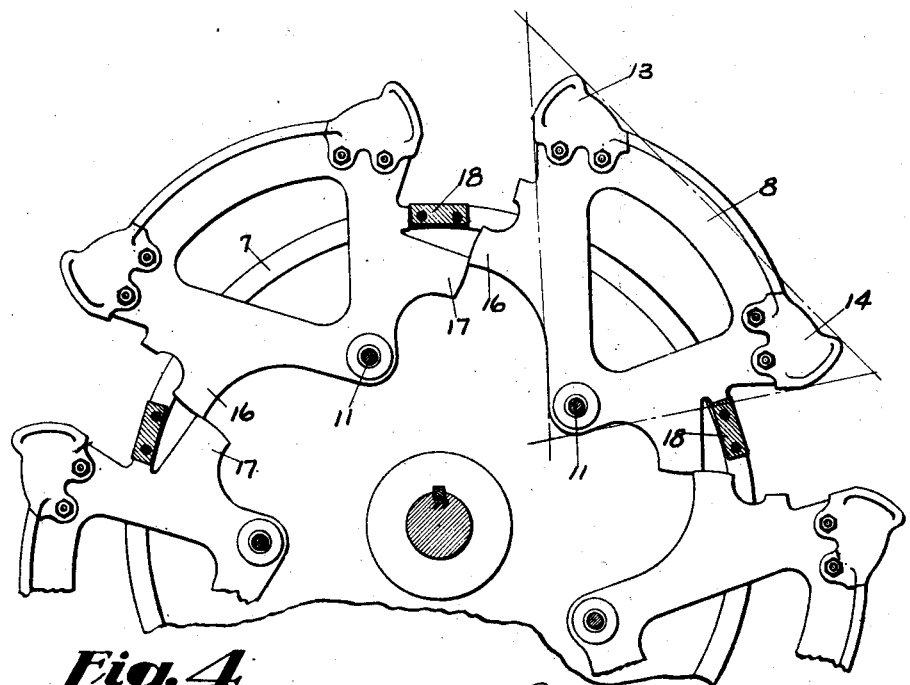
Fig. 4 is a fragmentary sectional view taken along the line IV—IV of Fig. 3.

As shown in the drawings, the numeral 1 refers to a driving shaft, and the numeral 2 to a driven shaft to which are fixed respectively the cable sheaves 3 and 4 arranged in operative engagement with an endless cable 5 to transmit power from the driving shaft 1 to actuate the driven shaft 2. The sheaves 1 and 2 are similar in construction and a description of one will apply to both. Keyed to the shaft 1 are two hubs 6 each having a circular flange 7 concentric with the shaft and extending in parallel juxtaposition perpendicular to said shaft. Between the discs 7 are positioned segmental rim sections 8 provided with laterally flaring side flanges 9 which form the cable seats 10. These rim sections 8 are eccentrically pivotally mounted upon the pivot bolts 11 which extend through suitable apertures in both of the discs. At the ends of the rim sections 8 are fixed tooth members 13 and 14 which are adapted to engage the transmission blocks 15 secured to the cable 5 at equally spaced intervals, and the proportions of the parts are such that the spaces between the forward tooth of one rim section and the rearward tooth of the adjacent rim section are materially greater than the length of the transmission blocks. Formed on the rim sections 8 are projections 16 and 17 adapted to engage the corresponding projections of the adjacent rim sections, so that rotary movement of one rim section about its pivot 11 causes similar movement of all of the rim sections of the wheel. Stops 18 attached to the disc 7 are arranged to engage the rim section 8 to limit their rotary movement about the pivot bolts 11.

When the driving wheel 3 revolves its driving tooth members 13 engage the transmission blocks 15 to propel the cable 5, and said transmission blocks engage the driven tooth members 14 of the driven wheel 4 to cause rotation of the shaft 2. To secure smoothness of action the circumferential pitch of the teeth upon the driving wheel must be slightly greater, and that of the teeth upon the driven wheel slightly less than the pitch of the transmission blocks upon the cable, so that only one transmission block is in engagement with the teeth of each wheel at any time. The contacting surfaces of the driving tooth members 13 are sloped outwardly and rearwardly, and those of the driven tooth members 14 are sloped outwardly and forwardly in such manner that as the cable 5 leaves the wheel the transmission blocks 15 slide outwardly upon the engaging tooth members permitting the following transmission blocks to successively engage their respective teeth without shock. When the above described wheels act to drive the cable, the pressure of the transmission blocks 15 upon the tooth members 13 tends to rotate the rim sections 8 rearwardly about the pivot bolts 11, thereby moving the forward corner of said rim section outwardly to increase the pitch diameter of the wheel and the consequent pitch of the driving tooth members 13. In like manner when such wheels are driven by the cable the pressure of the tooth member 14 upon the transmission block 15 tends to rotate the rim section 8 forwardly about its pivot bolt 11, thereby moving the forward corner of said rim section inwardly proportionately reducing the pitch diameter of the wheel and the consequent pitch of the driven tooth members 14.

Figure 5:
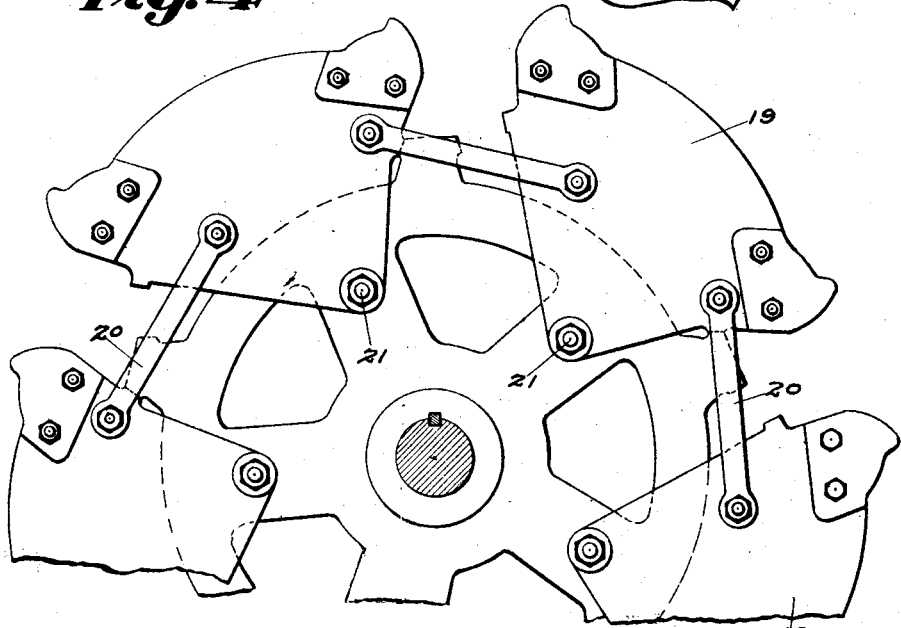
Fig. 5 is a fragmentary side elevation of a modified form of my invention.

In Fig. 5 of the drawings I have shown a modification of the devices above described wherein the rim sections 19 are connected together by a link 20 in such manner that rotation of one rim section about its pivot bolt 21 will cause simultaneous rotation of all of the rim sections of the wheel. It is to be understood, however, that I do not limit myself to the construction above specifically described as the devices here shown may be subject to wide variation as to detail without departure from the spirit of my invention.

What I claim is:—

1. In a wheel of the class described, the combination with a wheel center, of a rim adapted to engage a flexible draft member having spaced transmission elements, said rim comprising a plurality of similar sections movably attached to said center and adapted when driving effort is applied by said wheel to said transmission elements to automatically move all of said sections outwardly to expand the entire rim, as and for the purpose set forth.

2. In a wheel of the class described, the combination with a wheel center, of a rim adapted to engage a flexible draft member having spaced transmission elements, said rim comprising a plurality of similar sections movably attached to said center and adapted when driving effort is applied to said wheel by said transmission elements to automatically move all of said sections inwardly to contract the entire rim, as and for the purpose set forth.

3. In a wheel of the class described, the combination with a wheel center, of a rim adapted to engage a flexible draft member having spaced transmission elements, said rim comprising a plurality of similar sections movably attached to said center and adapted when driving effort is applied by said wheel to said transmission elements to automatically move outwardly to expand the entire rim and when driving effort is applied to said wheel by said transmission elements to automatically move inwardly to contract the entire rim, as and for the purpose set forth.

4. In a wheel of the class described, a rim having teeth adapted to engage spaced transmission elements on a flexible draft member, and means for automatically uniformly increasing or decreasing the pitch of said teeth throughout the circumference of the rim, depending as to whether the wheel or the draft member is the driving element.

5. In a wheel of the class described, the combination with a wheel center, of a rim adapted to engage a flexible draft member having spaced transmission elements, said rim comprising a plurality of similar sections pivotally mounted for rotation about centers outside the center of said wheel and adapted when driving effort is applied by said wheel to said transmission elements to be rotated in one direction to automatically expand said rim and when driving effort is applied to said wheel by said transmission element to be rotated in the opposite direction to automatically contract said rim, and means to cause simultaneous corresponding rotation of all of said rim sections, as and for the purpose set forth.

6. In a wheel of the class described, the combination with a wheel center; of a rim adapted to engage a flexible draft member having spaced transmission elements, said rim comprising a plurality of similar sections movably attached to said center and adapted when driving effort is applied by said wheel to said transmission elements to automatically move outwardly to expand the rim, and links extending between and pivotally attached to adjacent transmission elements to cause their simultaneous movement.

7. In a wheel of the class described, the combination of a wheel center; and a rim composed of a plurality of sections attached to and movable relative to said center under driving stresses to vary the rim diameter, each section having a pair of tooth members having different circumferential pitch.

8. In a single contact motion and power transmitter, a toothed wheel, and a flexible draft member having spaced transmission elements, and teeth mounting means for the teeth of said wheel whereby the pitch of said teeth is automatically increased over the pitch of said transmission elements when the wheel is the driving member, and decreased below the pitch of said transmission elements when said wheel is the driven member.

9. In a wheel of the class described, the combination of a wheel center; and a rim composed of a plurality of sections pivoted upon and movable relative to said center under driving stresses to vary the rim diameter, each section having a pair of tooth members arranged different distances from its pivot.

10. In a wheel of the class described, the combination of a wheel center; and a rim composed of a plurality of sections attached to and movable relative to said center under driving stresses to vary the rim diameter; each section having a pair of tooth members having different circumferential pitch, said sections being disposed in interacting relation so as to impart movement of one section to succeeding sections.

11. In a wheel of the class described, the combination with a wheel center; of a rim adapted to engage a flexible draft member having spaced transmission elements, said rim comprising a plurality of similar sections movably attached to said center and adapted when driving effort is applied to said wheel by said transmission elements to automatically move inwardly to contact the rim, and links extending between and pivotally attached to adjacent transmission elements to cause their simultaneous movement.

12. In a wheel of the class described, the combination with a wheel center: of a rim adapted to engage a flexible draft member having spaced transmission elements, said rim comprising a plurality of similar sections movably attached to said center and adapted when driving effort is applied by said wheel to said transmission elements to automatically move outwardly to expand said rim and when driving effort is applied to said wheel by said transmission elements to automatically move inwardly to contract said rim, and links extending between and pivotally attached to adjacent transmission elements to cause their simultaneous movement.

13. In a wheel of the class described, the combination with a wheel center: of a rim adapted to engage a flexible draft member having spaced transmission elements, said rim comprising a plurality of similar sections pivoted upon said wheel center, a pair of tooth members on each section, the tooth members of each section being arranged different distances from the pivot of their respective section, and said sections adapted to move inwardly when driving force is exerted upon the teeth of the sections having the shorter radii, and outwardly when driving force is exerted by the teeth having the longer radii.

In testimony whereof I have hereunto set my hand.

MERRILL HIBBARD.